United States Patent
Brown et al.

(10) Patent No.: US 10,567,535 B2
(45) Date of Patent: Feb. 18, 2020

(54) MONITORING AND ALERTING A USER TO VARIANTS FROM PREDICTED PATTERNS BASED ON REAL TIME DEVICE ANALYSIS

(71) Applicant: INTERNATIONAL BUSINESS MACHINES CORPORATION, Armonk, NY (US)

(72) Inventors: Dean T. Brown, San Francisco, CA (US); Hernan A. Cunico, Holly Springs, NC (US); Martin G. Keen, Cary, NC (US); David W. Messina, Malden on Hudson, NY (US)

(73) Assignee: International Business Machines Corporation, Armonk, NY (US)

( * ) Notice: Subject to any disclaimer, the term of this patent is extended or adjusted under 35 U.S.C. 154(b) by 287 days.

(21) Appl. No.: 15/417,885

(22) Filed: Jan. 27, 2017

(65) Prior Publication Data

US 2018/0219759 A1 Aug. 2, 2018

(51) Int. Cl.
*G06F 15/173* (2006.01)
*H04L 29/08* (2006.01)
(Continued)

(52) U.S. Cl.
CPC .............. *H04L 67/26* (2013.01); *H04L 43/06* (2013.01); *H04L 43/10* (2013.01); *H04L 51/046* (2013.01);
(Continued)

(58) Field of Classification Search
CPC ......... H04L 67/22; H04L 67/26; H04L 67/32; H04L 43/06; H04L 43/10; H04L 63/1425; H04L 51/046; H04L 51/20; H04L 51/32
(Continued)

(56) References Cited

U.S. PATENT DOCUMENTS 8,589,174 B2 11/2013 Nelson et al.
9,245,396 B2 1/2016 Delong et al.
(Continued)

OTHER PUBLICATIONS

Fahad, Labiba Gillani et al.; Long term analysis of daily activities in a smart home; European Symposium on Artificial Neural Networks, Computational Intelligence and Machine Learning; Apr. 24-26, 2013; pp. 419-424.
(Continued)

*Primary Examiner* — Wing F Chan
*Assistant Examiner* — Andrew Woo
(74) *Attorney, Agent, or Firm* — Schmeiser, Olsen & Watts; James Nock

(57) ABSTRACT

A program product for detecting abnormal behavior of users is disclosed. A computer identifies first and second users based on user definitions and at least one personal device associated with the users. Activities of the users are monitored in real time based on the user definitions, location data received over a time series from the personal devices. A proximity distance, between the personal devices over the time series, is identified based on the location data. The computer generates movement patterns for the personal devices over the time series based on the location data and the proximity distance and creates a workflow. The computer compares the current location with the workflow in real time, and detects a deviation from the workflow in response to the comparing the current location in real time. The computer generates an alert in response to the detecting deviation in real time.

20 Claims, 7 Drawing Sheets

(51) Int. Cl.
    *H04L 29/06*     (2006.01)
    *H04L 12/58*     (2006.01)
    *H04L 12/26*     (2006.01)

(52) U.S. Cl.
    CPC .............. *H04L 51/20* (2013.01); *H04L 51/32* (2013.01); *H04L 63/1425* (2013.01); *H04L 67/22* (2013.01); *H04L 67/32* (2013.01)

(58) Field of Classification Search
    USPC .................................................. 709/223, 224
    See application file for complete search history.

(56) References Cited

U.S. PATENT DOCUMENTS

| | | | |
|---|---|---|---|
| 9,317,834 B2 * | 4/2016 | Horvitz | G06Q 10/10 |
| 2014/0075464 A1 | 3/2014 | McCrea | |
| 2015/0067845 A1 | 3/2015 | Chari et al. | |
| 2015/0087258 A1 * | 3/2015 | Barnes | H04W 4/90 |
| | | | 455/404.2 |
| 2015/0095216 A1 | 4/2015 | Van Heerden et al. | |
| 2016/0066864 A1 * | 3/2016 | Frieder | G06F 16/9535 |
| | | | 600/300 |

OTHER PUBLICATIONS

Franke, Martin et al.; Monitoring Daily Routine Anomalies in Assisted Living Environments; Attention for Social Intelligence at the International Conference of Social Robotics; Oct. 2014; 10 pages.

* cited by examiner

US 10,567,535 B2

MONITORING AND ALERTING A USER TO VARIANTS FROM PREDICTED PATTERNS BASED ON REAL TIME DEVICE ANALYSIS

TECHNICAL FIELD

This disclosure relates generally to an improved data processing system, and, in particular, to processing information related to user behavior. Still more particularly the present disclosure relates to a method and apparatus for detecting abnormal behavior of users based on device analysis in real time.

BACKGROUND

Incidents of missed appointments, scheduling errors and forgotten accessories occur on a frequent basis. Often, there are news reports that a parent forgot to drop the parents' children to the day care when they instead went directly to the parents' job site. This is particularly true when that task is normally done by the other parent. Likewise, there are reports of parents forgetting a child's car seat or a child's doctor's appointment. Similar situation can occur on any workflow, specifically those involving multiple actors. The need exists for a system and method to assist people with managing multiple events, situations and accessories on a daily basis.

SUMMARY

A method, apparatus, and computer program product for detecting abnormal behavior of users is disclosed. A computer identifies a first user based on a first user definition and at least one first-user personal device associated with said first user. A computer identifies a second user based on a second user definition and at least one second-user personal device associated with said second user. Activities of said first and second users are monitored in real time based on said first and second user definitions, first location data received over a time series from said first-user personal device, and second location data received over said time series from said second-user personal device. A proximity distance, between said first-user and said second-user personal devices over said time series, is identified based on said first and second location data. The computer generates a first movement pattern for said first-user personal device and a second movement pattern for said second-user personal device over said time series based on said first and second location data and said proximity distance. The computer compares said current location with said at least one workflow in real time. The computer detects a deviation from said at least one workflow in response to said comparing said current location in real time. The computer generates an alert in response to said detecting said deviation in real time.

DETAILED DESCRIPTION

Figure 1:
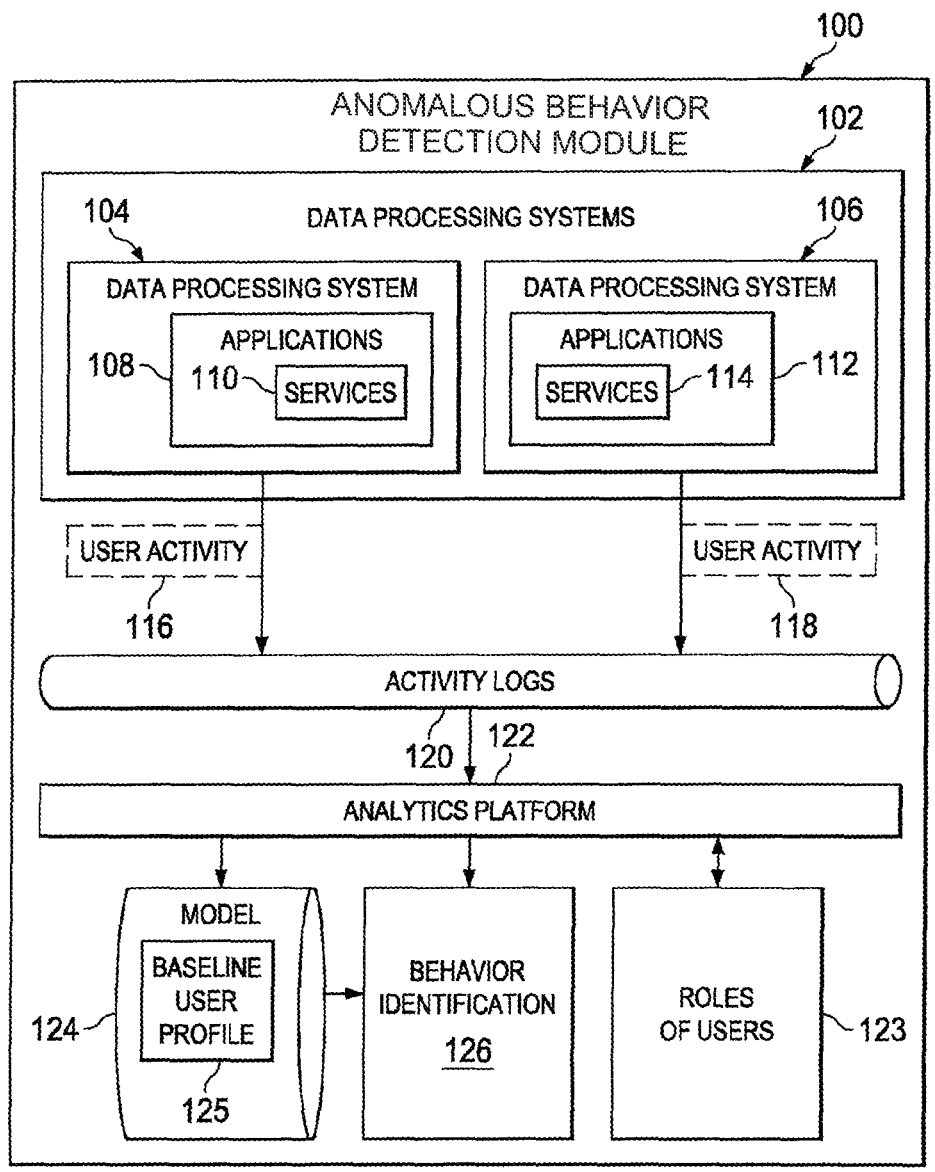
FIG. 1 is a block diagram of a data flow of a process for detecting abnormal behavior of users in an anomalous behavior detection module, in accordance with an embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The different illustrative embodiments provide a method, apparatus, and computer program product for detecting abnormal and inconsistent behaviors of users, and sending an alert to other group members when variations occur. The system can send an alert if an event, which is different from a regular pattern, is expected and no variation is detected. For example, a number of components of an anomalous behavior detection module may use a process for storing workflow patterns and from these patterns create interaction workflows with group members involved. The relationships within the group can be predefined or can be learned over time. The system can also integrate with an external calendar service to further enhance pattern analysis. For example, an analytics platform component may identify from a log of user activity by monitoring routines of individuals within a group, then determine group routines based on individual routines analysis. Workflows are then created that include interactions between different members of the group. Based on analysis of these workflows, alerts may be generated when variations occur.

In accordance with one embodiment of the present invention, the system monitors movement of each individual in the group and monitors interactions with other members of the defined group to create a workflow. The system monitors each individual in a group by keeping track of individual: location (termed "breadcrumbs"), name, relationships (e.g.; users A, B, and C are family. user A, D and E are friends), devices, personal effects, etc.

The system analyzes interaction patterns between users and devices and between users and associated devices, and the system creates workflows. These workflows can be associated with tasks performed by one or more users and the user's associated devices. For example, a workflow for User1 may be dropping kids off at school or a day care center, grocery shopping, going to and from work, etc. The devices associated with the user may be a car, a telephone, a tablet, a car seat, etc.

The system may determine and store information related to devices that remain with the same member all the time (termed "regular" articles)(e.g.; cell phone, wallet, keys, glasses, etc.) and devices that are or can be exchanged (termed "exchangeable" articles)(e.g.; car, car seat, tablet, umbrella, etc.) in a workflow. The system continues to monitor the users against the tracking history and looks for variations in the users' workflows. When the individual starts a workflow, the system validates all "regular" devices and which other user associated with that workflow is present.

When variations are detected, the system can interact with external calendar/scheduling services and related calendar information to enhance assertion on the anomaly in the workflow. The system uses the calendar information to update the tracking history and to notify the user(s) of any deviation on the expected devices or articles.

The system also issues alerts when there is any deviation from expected routes/paths. For example, the system would track historical route of travel to and from a day care center as data to be stored. The system would then monitor, via GPS or other location tracking, the current location or route of the user. Then, the system would identify when a user has deviated from the historical route of travel to that same day care center.

An example of a regular workflow or tasks is that John takes John's kid to school every morning with John's car. An unexpected task or workflow could be that John takes John's kid to school with John's wife's car.

In accordance with this invention, the system may interact with calendar or scheduling services and incorporate scheduled events into the workflows. The system may be used as a dynamic checklist generator/validator that can alert the user if something is missing before the user engages in an activity. Moreover, the system may be able to take corrective actions beyond just notification/alerts; e.g., not opening the garage door if the user is missing the user's driver's license. Additionally, the alerts may be prioritized depending on the urgency or significance of the deviation from an historical workflow. The urgency, for example, may be dependent on the time delay or lateness of the user to a specific event or location.

There are two levels of predicted pattern analysis alerts: (1) personalized alerts—alerts generated through analysis of a particular workflow and defined set of participants. Alerts are generated based upon past history and current activity of the participants; and (2) aggregate alerts—alerts generated through analysis of aggregate workflows with similar participants. Alerts are generated based on aggregate past history and current activity of a defined set of participants.

The invention monitors the location and movement of people and tracks the location of the people through a number of existing and contemplated tracking systems. For example, a person's location may be determined using GPS operating on a person's cell phone, a person's vehicle, or other item carried by a user. Likewise, a person's location may be determined by a login process at the individual's office, or when an individual's identification badge is swiped at a work location or a license or passport is detected by an appropriate authority. Other types of user input may include social media which may actively track a person's location such as when the checks in at a particular location or passively track a person's location at work, school, a doctor's appointment, etc. Similarly, a person's location may be tracked using advanced image recognition which may include image cognitive analysis or image semantic analysis as will be understood by those of skill in the art.

FIG. 1 is a block diagram of a data flow of a process for detecting abnormal behavior of users in an anomalous behavior detection module, in accordance with an embodiment of the present invention. Anomalous behavior detection module 100 is an example of a module for detecting abnormal behavior of users. As depicted, anomalous behavior detection module 100 includes a number of data processing systems 102, such as data processing system 104 and data processing system 106. In these illustrative examples, data processing system 104 executes applications 108 and data processing system 106 executes applications 112 to provide services. Applications 108 provide services 110 and applications 112 provide services 114.

In these illustrated examples, user activity 116 and user activity 118 are examples of user activities associated with data processing systems 102. As depicted, user activity 116 and user activity 118 are stored in activity logs, such as activity logs 120. In these illustrative examples, user activity is any activity of a user associated with using data processing systems. For example, user activity 118 may be an activity associated with a role in roles of users 123. In these illustrative examples, a role of users is an authority assigned to users to do particular activities.

Analytics platform 122 is a component of anomalous behavior detection module 100 for scoring and producing a baseline profile for a user. In these illustrative examples, analytics platform 122 generates roles of users 123. In these illustrative examples, role mining methods may be used by analytics platform 122 to identify roles of users 123 from activity logs 120. Each role in roles of users 123 is an authority for activity of users in activity logs 120. Analytics platform 122 also generates model 124 of time spent in roles for a user. Analytics platform 122 generates baseline user profile 125 in model 124 for a user by fitting user activity of the user to a global model for roles of users and obtaining a list of role fitness values. The list of role fitness values is a degree to which the user belongs to each role within a time period from which the user actions were drawn or obtained. As used herein, a global model for roles of users is an initial model for a number of users.

Baseline user profile 125 can be generated in one of several ways. For example, a baseline profile may be defined as the amount with which a user acts in each role in the either a first time period the user is active, or another time period from which the global model is built, whichever comes later. Baseline user profile 125 may be generated by any of several techniques for role mining. Baseline user profile 125 may be generated from a longer time period than used for scoring. For example, baseline user profile 125 may be generated over a time period that is ten (10) times longer than a time period used for scoring. In these illustrative examples, baseline user profile 125 may include an aggregate fitted model that is generated for the user. For example, a series of fittings may be generated by any of several techniques for role mining. For example, generative role mining methods may be used to generate a series of fittings for a user for a time period that is ten (10) times longer than a scoring period for each of a number of users. In this example, a secondary model is built over the series of fittings to determine a measure of uncertainty and significance with which each role is acted in, and to detect periodic user behavior. In this example, the secondary model may be built by clustering the individual fitting scores, using known techniques, such as k-means, Gaussian model, or a mixture of k-means and Gaussian model. In this example, a one-class classifier system, such as a support vector machine, is built to learn the samples.

Behavior identification 126 is a component of anomalous behavior detection module 100 for measuring an amount of deviation between the user's actions in a later time period and the model. To measure the amount of deviation between the user's actions in a later time period and the model, user activities of a user are fit to the model to obtain a list of role fitness scores. For example, using a role fitness profile of the user, a distance function, such as root mean squared error, Kullback-Liebler divergence, or mean absolute error, is applied to measure an amount of deviation between the role fitness profile of the user and the obtained role fitness for the later time period. In this example, when the deviation exceeds a threshold, an alert is raised. As another example, using the secondary model built above, role fitness scores may be compared with the secondary model for deviation. In this example, identifying an amount of deviation is based on how the secondary model is generated. For example, if the k-means algorithm was applied to generate the secondary model then the distance to the nearest cluster centroid can be compared to the mean and standard deviation for all points belonging to that cluster. In this example, when the distance exceeds a threshold an alert is raised. Similarly, if a mixture of Gaussian model is used then the probability that the list of role fitness scores was drawn from the distribution can be calculated and alerted when the probability is statistically significant. Alternatively, when a one-class classifier algorithm is used, an anomaly score may be returned. For example, when a one-class support vector machine (SVM) is used the anomaly score is the distance from the hyperplane. In this example, when the anomaly score exceeds a threshold an alert is generated.

The illustration of anomalous behavior detection module 100 in FIG. 1 is not meant to imply physical or architectural limitations to the manner in which different illustrative embodiments may be implemented. Other components in addition to and/or in place of the ones illustrated may be used. Some components may be unnecessary. Also, the blocks are presented to illustrate some functional components. One or more of these blocks may be combined and/or divided into different blocks when implemented in an illustrative embodiment.

For example, in some illustrative examples, additional components in addition to analytics platform 122 and behavior identification 126 may be present within anomalous behavior detection module 100. For example, another component of analytics platform 122 may generate a role model for a user using one or more of a discrete and probabilistic role mining, single and multi-clustering algorithms, generative models, such as latent Dirichlet allocation, and hidden topic Markov models. In this example, the role model generation process takes as input a set of user activity over a given time period and produces a model of roles defined by the set of user activity. In these illustrative examples, new user activity is then fit to the role model of the user to produce a vector of fitness functions indicating the degree to which the user as defined by the activity pattern matches to the role model of the user.

Also, although data processing systems 102, activity logs 120, analytics platform 122, and behavior identification 126 are shown as separate blocks in anomalous behavior detection module 100, all or a portion of these may also be implemented in data processing systems 102 or other suitable components in anomalous behavior detection module 100. In these illustrative examples, anomalous behavior detection module 100 may be implemented by any combination of hardware and software products, and may also be implemented in one or more computer systems of a cluster of computer systems. As used herein, the term system refers to any computing system or data processing system that operates to perform the functions described below as shown by way of example in FIGS. 1 and 2.

Figure 2:
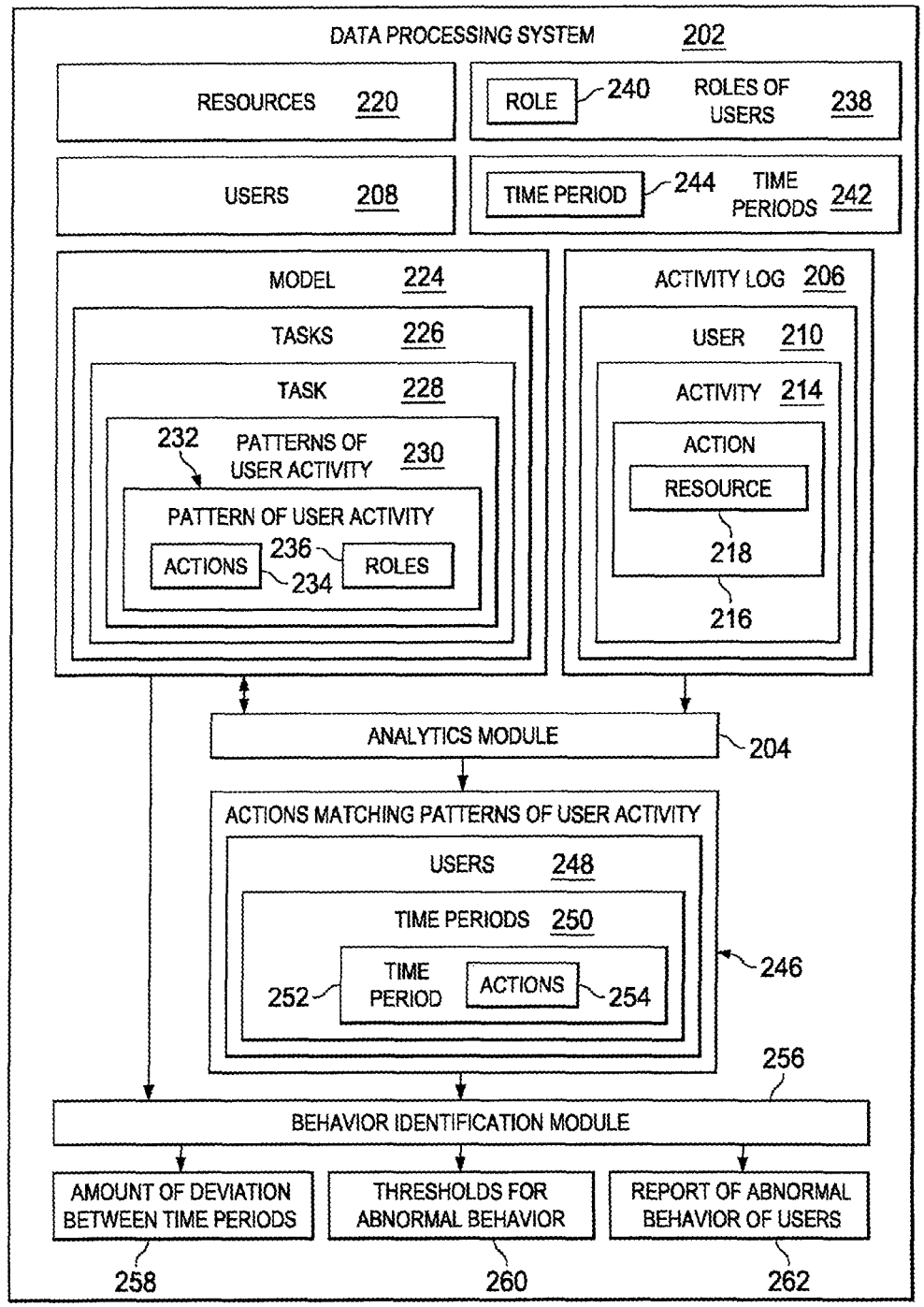
FIG. 2 is a block diagram of components in a data processing system involved in detecting abnormal behavior of users, in accordance with an embodiment of the present invention.

FIG. 2 is a block diagram of components in a data processing system involved in detecting abnormal behavior of users, in accordance with an embodiment of the present invention. Turning now to FIG. 2, data processing system 202 may be any combination of hardware and software components implementing a process for detecting abnormal behavior of users. As depicted, analytics module 204 in data processing system 202 is an example of one implementation of analytics platform 122 in FIG. 1. Analytics module 204 processes activity log 206 in these illustrative examples. Activity log 206 is an example of one implementation of activity logs 120 in FIG. 1. Activity log 206 stores activities of users 208. User 210 is an example of a user in users 208 with activity in activity log 206.

As depicted, activity 214 is an activity of user 210 in activity log 206. As depicted, activity 214 may comprise action 216 taken by user 210. For example, activity 214 may be providing a password in response to a prompt. In this example, when user 210 provides a password, the user may be performing an activity known as logging in. As also depicted, action 216 taken by user 210 may be associated with resource 218. For example, when user 210 wishes to gain access to resource 218, user 210 may log into resource 218.

In these illustrative examples, resource 218 is an example of a resource in resources 220. In the illustrated examples, resources 220 include data processing systems, storage devices, and any suitable combination of hardware and software for use by users 208.

Analytics module 204 generates model 224, in these illustrated examples. Model 224 is an example of one implementation of model 124 in FIG. 1. Model 224 includes tasks 226. Task 228 is an example of a task in tasks 226 comprising patterns of user activity 230. In the illustrated examples, patterns of user activity 230 are performed by user 210 to complete task 228.

As depicted, pattern of user activity 232 is an example of patterns of user activity 230 comprising actions 234 and roles 236. Actions 234 are examples of action 216 and roles 236 are examples of roles of users 238. Roles of users 238 is an example of roles of users 123 in FIG. 1. In these illustrative examples, role 240 is an example of a role in roles of users 238. As used herein, a role of a user, such as role 240, is a function or position of a user taken while performing one or more tasks in tasks 226. For example, a manager takes the role of manager when managing users.

Analytics module 204 generates model 224 over particular time periods, such as time period 244 in time periods 242. In these illustrative examples, time period 244 may be a time period for model 224. For example, time period 244 may be selected as a time period for a prior year, a prior month, and other periods of time that are suitable periods of time for model 224. For example, time period 244 may be selected to include time periods in the past when a number of activities of users 238 occurred that are similar to a number of current activities of user 210. In these illustrative examples, analytics module 204 may also generate actions matching patterns of user activity 246 for users 248 for time periods 250. As depicted, actions 254 for time period 252 is an example of actions matching patterns of user activity 246.

Behavior identification module 256 is a component of data processing system 202 that is implemented in hardware, software, or a combination of hardware and software. Behavior identification module 256 is an example of one implementation of behavior identification 126 in FIG. 1. As depicted, behavior identification module 256 processes actions matching patterns of user activity 246 in a process for identifying abnormal behavior of a user in users 208. In these illustrative examples, behavior identification module 256 determines amount of deviation between time periods 258 based on a calculated amount of deviation between actions taken by one or more users in the same roles over selected time periods in time periods 242 In these illustrative examples, amount of deviation between time periods 258 identifies a difference between amounts of time spent by a user in one or more roles in roles of users 238. For example, behavior identification module 256 may divide a first number of actions performed by user 210 over a first time period into a number of subgroups of actions performed by user 210 over a number of subintervals of time that are disjoint and continuous over the first time period. In this example, behavior identification module 256 may calculate amount of deviation between time periods 258 using differences between one or more amounts of deviation between a second number of actions performed by user 210 in a second time period and each of the number of subgroups.

As depicted, behavior identification module 256 determines if an amount of deviation between time periods 258 exceed a predetermined threshold for abnormal behavior 260. In the illustrated examples, responsive to the amount of deviation between time periods 258 exceeding one of thresholds for abnormal behavior 260, behavior identification module 256 may generate a report of abnormal behavior of users 262. As depicted, the report of abnormal behavior of users 262 may comprise information about the amounts of deviation between time periods 258 for time spent by users 208 in one or more roles of users 238.

Figure 3:
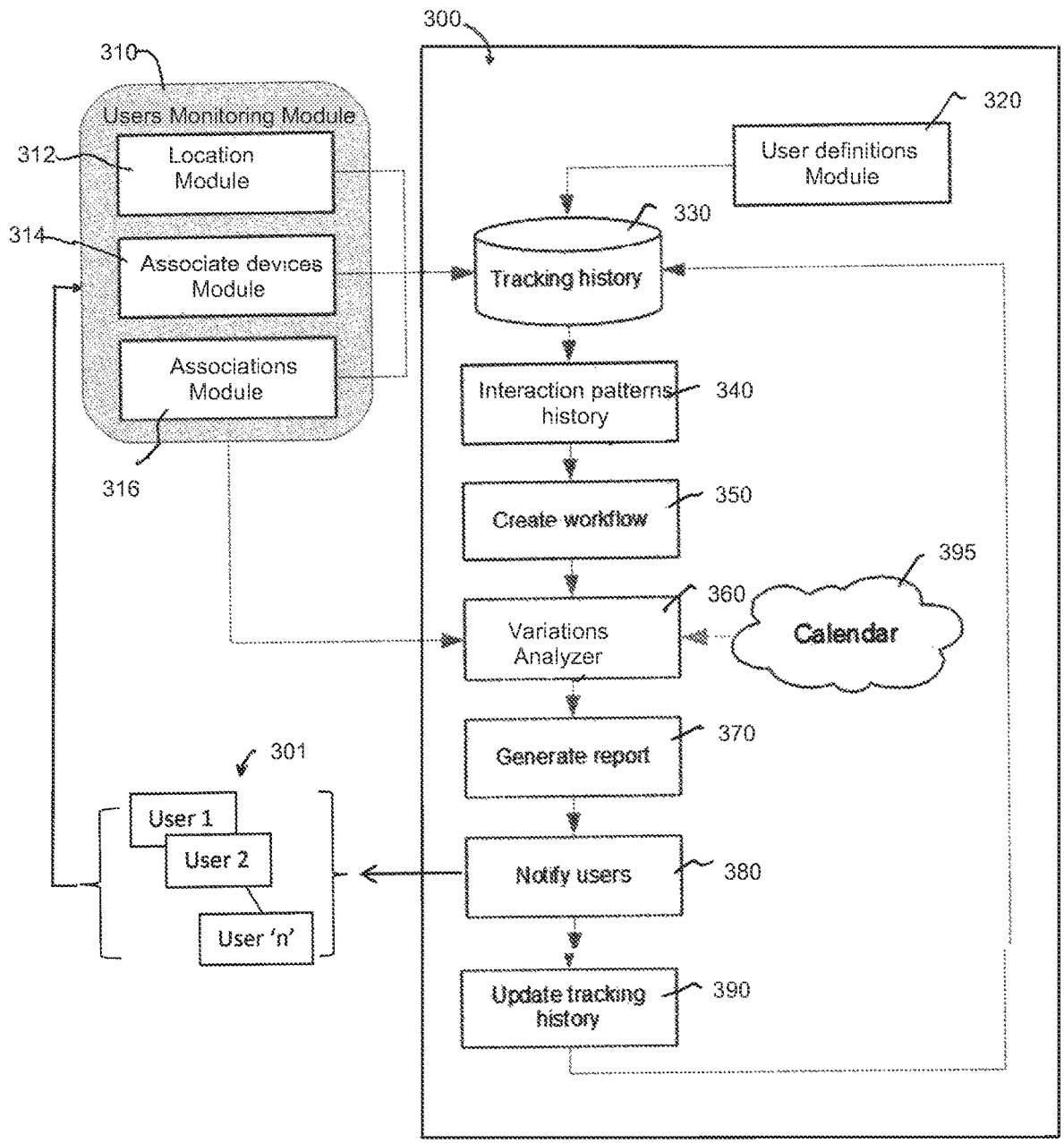
FIG. 3 is a flow chart of a process for detecting abnormal behavior of users, in accordance with an embodiment of the present invention.

FIG. 3 is a flow chart of a process for detecting abnormal behavior of users, in accordance with an embodiment of the present invention. With reference to FIG. 3, an example of a personalized alert scenario with anomalous behavior detection is provided. The personalized alert scenario is based upon what participants or users 301 have done in the past, what they are doing now, and what they are predicted to do next as indicators. Consider the following example with two parents, either of whom could pick up their child from day care. On most days the mother performs pick-up duties. The personalized alert scenario utilizes an anomalous behavior detection module 300 shown in FIG. 3, which system 202 tracks certain characteristics of the user 301 (e.g. User 1, User 2, ... User n) using a user monitor module 310 and user definition module 320. The user definitions module 320 provides preloaded data related to a particular user. The preloaded data of the user definitions module 320 may include the user's name, residence, age, family relationships, friends, coworkers, occupation, expected devices, exchangeable devices, and personal effects. The personal effects may include a purse, wallet, driver's license, passport, credit card, glasses, jewelry, and other personal effects that might uniquely identify the user. The user monitor module 310 includes additional user data entered into the system and monitoring data that is collected remotely from the user 301. It is noted that the anomalous behavior detection module 300 is analogous to the anomalous behavior detection module 100 of FIG. 1. The user monitoring module 110 shown in FIG. 1 includes a location module 312, an associated devices module 314, and a relationship module 316 indicative of the relationship of the user to other individuals in a workflow, which in this example are a mother and father. The user monitoring module 310 may track and monitor data associated with multiple users such as the mother, father and child or others in a particular scenario. The location module 310 may determine location by GPS running on a device carried by the user, user input of location, or other tracking systems as discussed above. The associated devices module 314 may monitor a location or condition of an item such as a cell phone, tablet, purse, wallet, keys, credit card, glasses or other personal item typically carried by the user(s). Location of the preceding types of items may be tracked by an RFID tag or similar device. The relationship module 316 may monitor existing relationships for the users such as family members, friends, coworkers, etc. and stores the interrelationship of each user to one another, including relative location to one another and personal interaction on any particular day. In accordance with the invention, the system 202 monitors activities of the user(s) based on the user definitions and location data of the user's personal devices or by other means described above.

Through use of the tracking history repository 330 and the interaction patterns history 340, the anomalous behavior detection module 300 is aware that today is a school day, that the child of the mother and father is in day care, and that the typical routine is for the mother to collect the child from day care. The interactive patterns history 340 also is aware that the mother leaves the mother's office at 5:30 pm and arrives at the day care at 5:45 pm. At step 350, a workflow is generated based upon this routine and stored, for example, in the model 124 including the baseline user profile 125 of FIG. 1 which may be incorporated into the anomalous behavior detection module 300 of FIG. 3.

Through continued tracking by the user monitoring module 310, the system 202 at step 360 analyzes and detects any variants in the generated workflow. In this example, the time is now 5:40 pm and the mother is still located at the mother's office. The anomalous behavior detection module 300 now uses the tracking history repository 330 to look for variants to all previously recorded patterns. The system operating according to the steps described herein will generate insight into likely variations. For example, this process may show that in 90% of previous workflows that match these parameters (mother is still located at office at 5:40 pm), the father performs the day care pick-up.

The variations analyzer module 360 can now use the user monitoring module 310 to determine if the father is en-route to the day care facility. The variations analyzer module 360 also integrates with an external calendar service 395 to further enhance pattern analysis by confirming scheduling data; e.g., meeting times, dates, locations, etc.

At step 370, a report is generated detailing the current workflow variant and historical workflow variants. This report is used to determine if a notification also not en-route to the day care facility (the historical variant) then an alert is issued. This alert can be issued to all parties (the anticipated party (i.e., the mother) and the variant party (i.e., the father) or just to one or the other. In this case the alert may read: "Alert: Neither parent is en-route to the day care facility and departure time is overdue". The users 301 (e.g.; User 1, User 2, ... User n) are notified of alerts at step 380. Alternatively, if the system 202 determines that the father is driving the father's own car to the day care center, the system 202 may be prompted to send an alert regarding the car seat to ensure that the father has a car seat before the father arrives at the day care center.

It will be understood by those of skill in the art that the various devices of the associated device module 314 may be fitted with a dedicated tracking device or have tracking information input by each user. For example, the car seat may include its own location tracking system or its location may be determined by default to the location of the last car driven to the day care center. Al of this information may be included in the user monitoring module 310 or may be pre-loaded into the user definitions 320. While the car seat has been used as an exemplary device, the same analysis holds for other devices such as a cell phone, a laptop, a tablet, an umbrella, a credit card, a pair of glasses, etc.

For alerts that do not require immediate action, the system 202 can generate non-disruptive alerts such as adding a time sensitive reminder to a user's calendar or a user's personal to-do list. The alert selected can be customized based on an observed user behavior. For a user that rarely checks a personal to-do list or calendar, a push notification alert may be most appropriate. Conversely, for a user that consistently checks the user's to-do list every hour, a to-do reminder may be the optimal form of notification.

The user monitoring module 310 continues to monitor the location of all parties until the final workflow task is reached (in this case arrival at the day care facility). The variations analyzer module 360 continues to analyze the current situation and maps this to historical workflows by updating the tracking history at step 390 and delivering the new data to the tracking history module 330 for future analysis. For example the system 202 now detects the mother has left the office but is now located in a wine bar. From analysis of historical workflows, in 100% of cases when the mother is located at the wine bar, the father performs the day care pick-up. The data accumulated related to the workflows brings new insight that indicates the father is responsible for day-care pickup today and has likely forgotten his duties. This time an alert is sent only to the anticipated party (i.e., the father), which may read: "Alert: You are late departing to the day care facility—depart immediately".

Figure 3A:
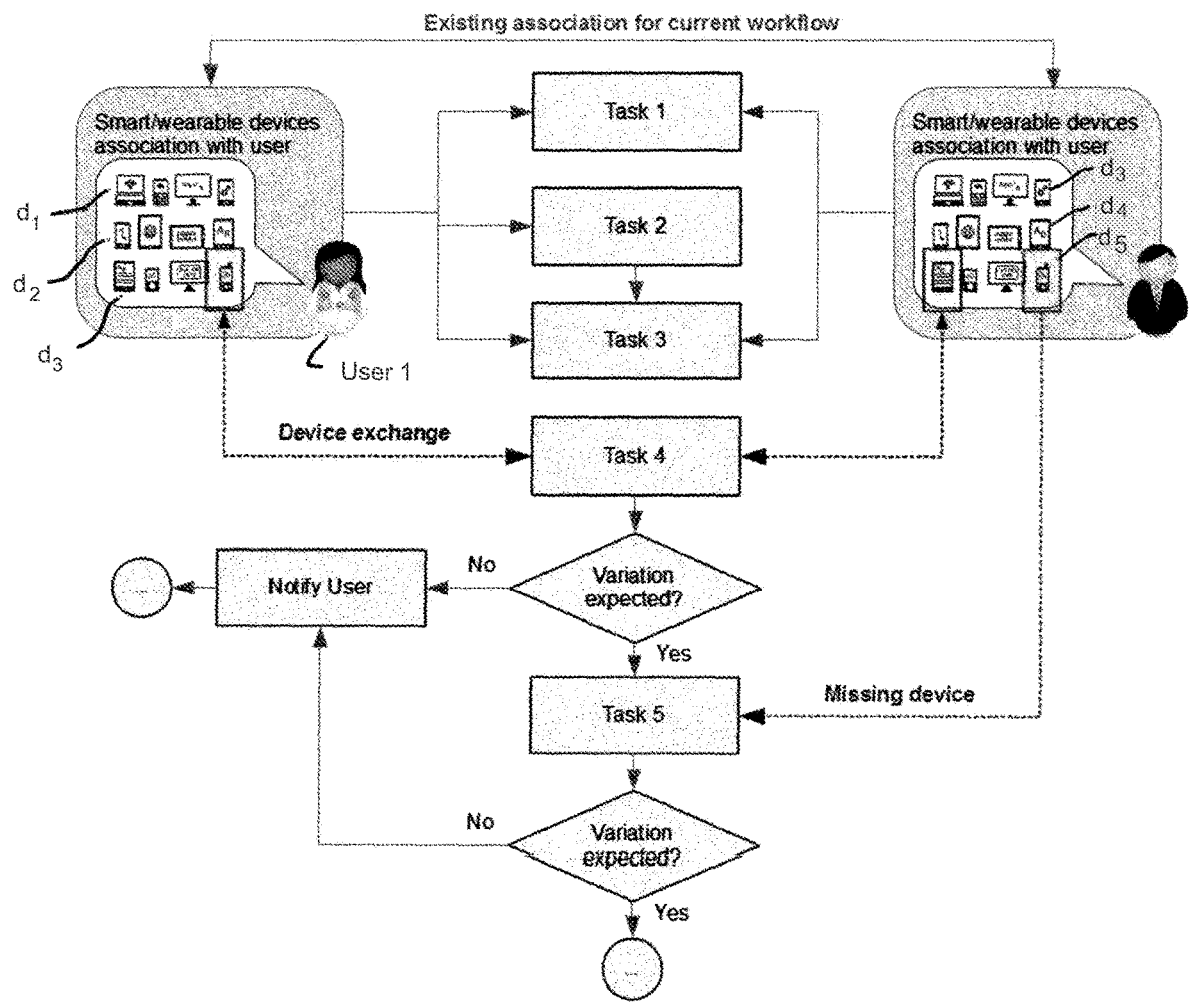
FIG. 3a is a flow chart of a process for detecting abnormal behavior of users, in accordance with another embodiment of the present invention.

FIG. 3a is a flow chart of a process for detecting abnormal behavior of users, in accordance with another embodiment of the present invention. In this embodiment, the users are defined or identified by their associated device amongst other data received by the system 202. By observing and aggregating historic workflows of each device associated with a user, the system may define what devices will be together (as in defining one specific user), as well as the time and location for each device. FIG. 3a captures that association of different devices for individual users and the tasks associated with each user.

For example, devices d1, d2 and d3 are associated with User 1, and devices d4, d5 and d6 are with User 2. In accordance with this invention, it is envisioned that the devices (d1, d2, d3 and d4, d5, d6), at that particular time, location and workflow, define or identify the user. The system 202 learns or receives data regarding a particular workflow by observing historic interactions and associations so the system 202 can predict with certain amount of confidence future workflows and their associated devices and thus, users. Once a workflow is created (see step 350 of FIG. 3), the system 202 will be able to identify deviations from historical or recorded workflows when analyzing the data received regarding a current activity of a user. This is possible because the devices (d1-d6) essential define the user, and the presence or absence of a device for a particular workflow may be tracked and monitored.

In the FIG. 3a, Tasks 1 and 3 are being performed by two "device-defined" users; i.e., User1 and User 2 as shown by the arrows. If within that workflow and specific task, a device is missing, exchanged or misplaced, the system 202 would identify or detect that a variation from historical observation has occurred and notify the user by issuing a notification or flag. Similarly, Task 2 is expected to be done by one user. Here, User 1. But, if both users are present or performing certain aspects of Task 2, depending on historical observation, a notification would be triggered.

As previously discussed, the system can receive and evaluate additional data to further refine these observations and notifications by understanding the relationships between the users, by receiving and checking calendar data, and by receiving and checking social media, etc. With this type of information, the system 202 is able to quickly detect a variation in a workflow and notify the necessary users. For example, John left home but mistakenly grabbed his wife's phone instead of John's phone. Or that John was supposed to drop John's child at day care and on a certain day John's wife had an appointment. The system 202 would be able to detect a variation since independently of John's individual, precursory task, John's wife's expected task is different and thus, a variation that can, retrospectively affect John's current task.

Figure 4:
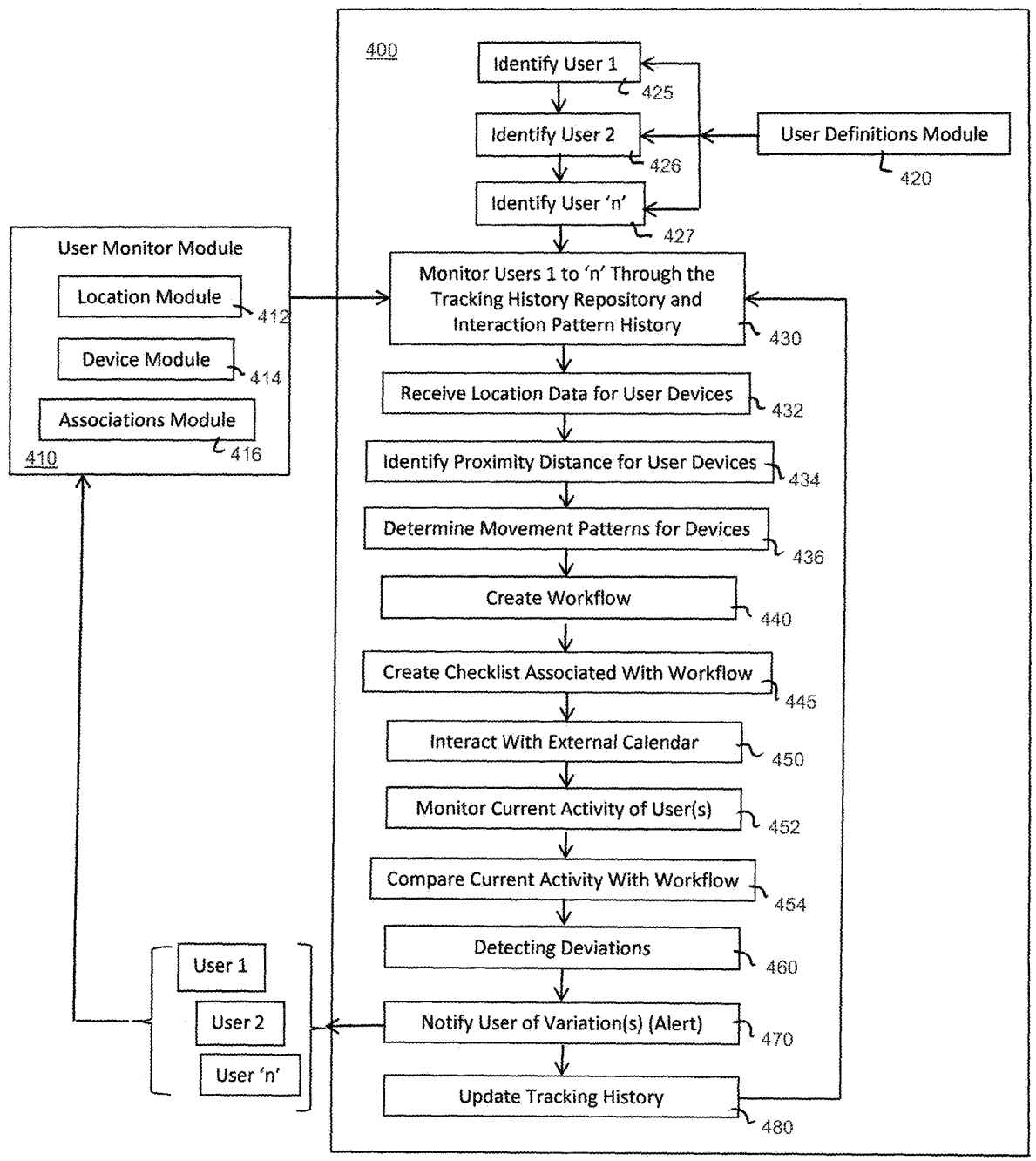
FIG. 4 is a flow chart of a process for detecting abnormal behavior of users, in accordance with an alternate embodiment of the present invention.

FIG. 4 is a flow chart of a process for detecting abnormal behavior of users, in accordance with an alternate embodiment of the present invention; The modified scenario according to the present invention represented in FIG. 4 provides behavior monitoring, analysis and alerts with an additional aspect of proactive notification of a user that certain deviations from historical data exist; e.g., notification that a user has forgotten an "expected device" or other personal effect like a wallet or driver's license. According to this modified scenario, the system 202 follows a method outlined in FIG. 4 whereby the system 202 provides notification to the user(s) of deviations from historical patterns regarding devices and locations, but also reviews a checklist associated with a workflow and provides proactive notification to the user when there is a deviation related to a device or personal effect. In effect, the system 202 reviews a checklist for the user and provides notification of any missing item or event features (e.g., the vehicle involved, a car seat associated with a workflow, routes of travel, etc.) before the user engages in a particular activity or workflow.

The personalized alert scenario of FIG. 4 utilizes an anomalous behavior detection module 400, which system 202 tracks certain characteristics of the user 301 (e.g. User 1, User 2, . . . User n) using a user monitor module 310 and user definition module 320. As with the process of FIG. 3, the system 202 begins by collecting and monitoring data related to each user including a user monitoring module 410 that collects data through a location module 412, a device module 414 and an associations module 414. The data may be input to the system 202 by a user or system operator, or the data may be collected from data sources such as public records, occupational records, cell phones, personal calendars, or other information sources. The system of FIG. 4 likewise includes a user definitions module 420 that includes preloaded data related to a particular user. The preloaded data of the user definitions module 420 may include the user's name, residence, age, family relationships, friends, coworkers, occupation, expected devices, exchangeable devices, and personal effects. The personal effects may include a purse, wallet, driver's license, passport, credit card, glasses, jewelry, and other personal effects that might uniquely identify the user. The user monitoring module 310 may track and monitor data associated with multiple users. The location module 310 may determine location by GPS running on a device carried by the user, user input of location, or other tracking systems. The associated devices module 314 may monitor a location or condition of a cell phone, tablet, purse, wallet, keys, credit card, glasses or other personal item typically carried by the user(s). The location and condition of each of these items may be monitored by way of a sensor or other tracking device mounted directly to the item or the item may be monitored by user input. The relationship module 316 may monitor existing relationships for the users such as family members, friends, coworkers, etc. and stores the interrelationship of each user to one another, including relative location to one another and personal interaction on any particular day.

At steps 425-427, the system 202 creates an identity for User 1, User 2, and . . . User 'n' where 'n' is a total number of users. As previously mentioned, the identity of each user may be selected from a previous file, input by an operator, and/or downloaded from data sources. For example, user data may be received from the user definition module 420 along with other data received by and input into the system 202.

At step 430, the system 202 begins the tracking history phase of the process whereby the system 202 monitors the location, devices and associations of each user by analyzing data received from the user definitions module 410 and the user monitor module 420.

At step 430, the system 202 monitors of the user(s) by way of the tracking history repository modules and the interaction patterns history modules discussed above with respect to FIG. 3. As a result, for example, the anomalous behavior detection module 400 is aware that today is a school day, that the child of the mother and father is in day care, and that the typical routine is for the mother to collect the child from day care. The interaction patterns history module also is aware that the mother leaves the mother's office at 5:30 pm and arrives at the day care at 5:45 pm. The system 202 further receives data at step 432 related to the location of certain devices carried by or otherwise associated with a particular user via the device module 414. By compiling the location data from various users, the system 202 may identify and determine at step 434 a proximity distance between each device being tracked at step 432 over a time series as well as the user location at a given time by way of the location module 412. In this way, the system 202 is able to determine, for example, that multiple users and/or the user devices are together at a certain location. It will be understood by those of skill in the art that the term "time series" refers to a period of time wherein certain discrete data points may be identified related to a particular person, article or device being monitored or tracked.

Because the system 202 may track user location (location module 412) and device location (device module 414) at any given point in time, the system 202 may compile and determine a movement pattern or movement patterns for multiple users at step 436 for the time series being analyzed and received at step 432. Thus, a user's movement flow or workflow may be tracked by the system for a given period of time and tracked or recorded at discrete intervals or points in time.

At step 440, a workflow is generated based upon this user routine and stored, for example, in the model 124 including the baseline user profile 125 of FIG. 1 which is incorporated into the anomalous behavior detection module 400 of FIG. 4. The workflow is a compilation of data associating a user with a movement flow over a given period of time to establish of historical record of the user's movement.

Next, at step 445 the system 202 creates a checklist based on the tracking history repository and the interaction pattern history. The checklist is a list of items or features historically associated with the workflow generated at step 440. The checklist created at step 445 is a compilation of data related to a particular workflow and may include information such as devices carried by the user, locations for each user, mode(s) of travel, vehicle(s), routes of travel, speed of travel, origination point, destination, detours along a particular path of travel, other individuals associated with a particular workflow, and other items, devices, places etc. associate with a user's tasks and events throughout a particular time series.

At step 450, the system 202 interacts with the respective calendaring systems for each user to assist in the monitoring process. This interaction with the external calendar service further enhances pattern analysis by confirming scheduling data; e.g., meeting times, dates, locations, etc. This data may be used to confirm event sequences and variations from planned schedules.

Next, at step 452, the system 202 monitors the users' current activities during a time series and/or workflow using data being collected by all of the data sources (e.g., user monitor module 410 and user definitions module 420) described above. Again, the system 202 is able to track a user's devices, personal interactions, locations, personal items, appointments, routes of travel, points of contact, etc. At step 454, the system 202 compares the data collected related to current activities (step 452) to the workflow created at step 440 and the checklist created at step 445.

Through continued tracking by the user monitoring module 410, the system 202 at step 460 analyzes, detects and identifies any variants in the data related to the current activities and compares the data with the workflow created or generated at step 440 and the checklist created at step 445. Step 460 detects a deviation of current activities from the historical workflow. Particularly, the system 202 of this example analyzes the checklist generated at step 445 to determine whether and anomalies exist such as missing personal items or devices historically associated with the workflow at issue. Likewise, the system 202 may identify a different route of travel for a particular workflow. In this example, the user has left the house 6:00 pm but the user is not currently in possession of his or her wallet. In this example, the system 202 at step 460 detects that user is approaching the user's car but the user's wallet is located inside of the house. The anomalous behavior detection module 400 now uses the tracking history repository 430 to look for variants to all previously recorded patterns to analyze the user's historical data with regard to the user's items including the user's wallet and generate insight into likely variations. For this example, this system 202 may show that in 97% of previous workflows that match these parameters (i.e., user leaving house at 6:00 pm), the user is in possession of the user's wallet.

At step 470, the system 202 will generate an alert or flag to notify the user of this deviation; i.e., the user has left the house without the user's wallet. The alert may be sent to the user's cell phone or other device in the possession of the user. Alternatively, the system 202 may send an alert to the user's car so that when the user starts the car the user will be notified that the user is without his or her wallet. Alternatively, the system 202 may send an alert to all individuals and/or users associated with a particular workflow alerting them of a possible variation in the historical flow of events, persons and/or other data related to an event.

In another example, the system 202 will review the workflow with data that the user is leaving the house at 6:00 pm and determine that the user's calendar indicates that the user is supposed to be making a phone call to work at 6:00 pm. At step 470, the system 202 will generate an alert to notify the user of this deviation; i.e., the user has left the house without making a call to work as scheduled. The alert may be sent to the user's cell phone or other device in the possession of the user and/or other users. Alternatively, the system 202 may send an alert to the user's car so that when the user starts the car the user will be notified that he or she has not made a scheduled call to the office at 6:00 pm.

At step 480, the user monitoring module 410 continues to monitor the location of all parties until the final workflow task is completed. The variations analyzer module continues to analyze the current situation and maps this to historical workflows by updating the tracking history at step 480 and delivering the new data to the tracking history repository and interaction pattern history for future analysis.

Aggregate alerts go beyond the tracking of individual users to look at the bigger picture of workflows with similar characteristics in aggregate. This modified embodiment operates in a similar method to personalized alerts (geo-monitoring, analyzing for variations, generating reports and notifying users, and continual analysis as presented above with respect to FIGS. 3 and 4) but applies to workflows in aggregate. Using the daycare pickup example again, the anomalous behavior detection module 300, 400 and particularly the variations analyzer 360, 460 may determine that 70% of users who follow the workflow "Pick-up Child At Day Care Facility A" have varied from the usual workflow by departing for the day care facility 45 minutes earlier than normal. This fact scenario indicates that a variant may be recognized by the variations analyzer 360, 460 and that other users following this workflow may need to be alerted. Perhaps, the school is closing early for bad weather, or a traffic jam is making it hard to reach the school. In this instance all workflow participants that are not following the variant (have not left 45 minutes early) are sent an alert at step 380, 470 describing the variant detected by the variations analyzer at step 360, 460. The system 202 may determine that other participants may also want to follow this variant. For example an alert may read: "Alert: Potential issue detected. 70% of parents are departing 45 minutes early for day care pickup today. You may consider departing earlier than usual."

Additional exemplary embodiments of the present invention are described below. In one example, the system 202 takes an existing workflow and adds a modification based on time and geography. Working off of the family scenario, this example involves a teenager, Jill, who drives to high school Monday-Friday. The system 202 has an existing workflow for Jane that involves Jane driving to school leaving the house at 7:30 am and returning by 4 pm. Jill's parents want to modify this workflow so that Jill drives to school on a Saturday night to see a basketball game but picks up a friend Jack along the way. There is also an existing workflow for Jill driving to Jacks house. Mom and Dad want to modify the school workflow to add the stop at Jack's house and an exception which triggers at 9:30 pm on Saturday night if Jack and Jill have not left the school for the trip home. The workflow becomes Jill drives to Jack's house and then on to school to see the basketball game. Possibly, there could be an exception to confirm that Jill and Jack arrive at school by the time of the start of the game. Another exception could be based on a departure from school grounds by a specific time. Assuming all goes well with the drive and the game (i.e. no traffic problems on the drive, no overtime for the game), no exceptions are triggered and Jack and Jill get home safely. If, on the other hand, the game goes into overtime and Jill and Jack leave the game late, the system 202 will generate an alert for the relevant parties. Thus, the system 202 provides adaptability of recorded workflows and exceptions that take into account unique situation that combine aspects of previously-generated workflows. Here, the system 202 has an historical workflow of Jill driving to school and the system allows for a modified workflow to create a new workflow related to Jill's trip to school on a Saturday night to watch a basketball game. Because most of the data related to Jill's trip to school is already recorded as historical data, the system 202 allows for exceptions and modification to existing workflow scenarios. Following the same examples outlined in FIGS. 3 and 4, the system will monitor Jill's location and devices (e.g., Jill's location relative to home and school, Jill's car, Jill's cell phone, Jill's purse, etc.) and alert the necessary people when variations or anomalies are detected.

There are also commercial applications to tying exceptions to specific places and times such as the commercial trucking business. Consider someone who owns a trucking company in the SF Bay Area and sends a truck daily to the port of Oakland to pick up a container from a ship. Apparently, the port of Oakland is a bit of a mess where this container operation may take an hour or 4 hours. The container then goes from Oakland to Hollister, Calif. where the container is unloaded and they may something back too. It is envisioned that the same system 202 may trigger an exception for this workload based on place and time for those occasions when the pickup at the port exceeds a certain amount of time. Likewise, there may be many example of workflows related to package deliveries, an appointment with cable or other communications companies, repairmen, etc., where they have to show up at one's house to install equipment at a particular time. The system could tack location and device and provide alerts to the necessary individuals involved in the workflow.

Figure 5:
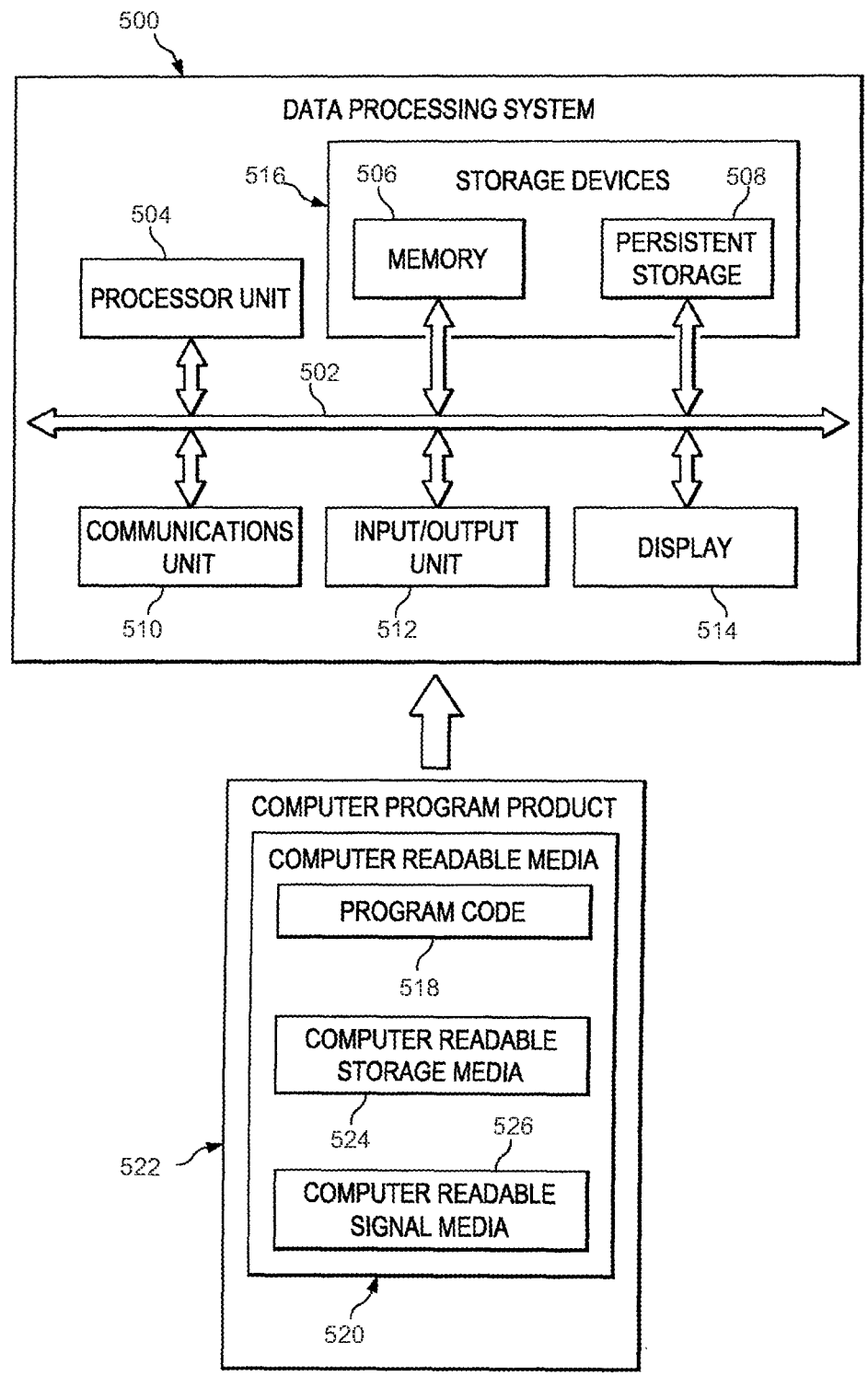
FIG. 5 is an illustration of a data processing system, in accordance with an embodiment of the present invention.

Turning now to FIG. 5, an illustration of a data processing system is depicted in accordance with an illustrative embodiment. Data processing system 500 is an example of a data processing system that may be used to identify abnormal behavior of users. More particularly, data processing system 500 may be used to implement data processing system 202 in FIG. 2. In this illustrative example, data processing system 500 includes communications framework 502, which provides communications between processor unit 504, memory 506, persistent storage 508, communications unit 510, input/output (I/O) unit 512, and display 514. In these examples, communications frame work 502 may be a bus system.

Processor unit 504 serves to execute instructions for software that may be loaded into memory 506. Processor unit 504 may be a number of processors, a multi-processor core, or some other type of processor, depending on the particular implementation. A number, as used herein with reference to an item, means one or more items. Further, processor unit 504 may be implemented using a number of heterogeneous processor systems in which a main processor is present with secondary processors on a single chip. As another illustrative example, processor unit 504 may be a symmetric multi-processor system containing multiple processors of the same type.

Memory 506 and persistent storage 508 are examples of storage devices 516. A storage device is any piece of hardware that is capable of storing information, such as, for example, without limitation, data, program code in functional form, and/or other suitable information either on a temporary basis and/or a permanent basis. Storage devices 516 may also be referred to as computer readable storage devices in these examples. Memory 506, in these examples, may be, for example, a random access memory or any other suitable volatile or non-volatile storage device. Persistent storage 508 may take various forms, depending on the particular implementation.

For example, persistent storage 508 may contain one or more components or devices. For example, persistent storage 508 may be a hard drive, a flash memory, a rewritable optical disk, a rewritable magnetic tape, or some combination of the above. The media used by persistent storage 508 also may be removable. For example, a removable hard drive may be used for persistent storage 508.

Communications unit 510, in these examples, provides for communications with other data processing systems or devices. In these examples, communications unit 510 is a network interface card. Communications unit 510 may provide communications through the use of either or both physical and wireless communications links.

Input/output unit 512 allows for input and output of data with other devices that may be connected to data processing system 500. For example, input/output unit 512 may provide a connection for user input through a keyboard, a mouse, and/or some other suitable input device. Further, input/output unit 512 may send output to a printer. Display 514 provides a mechanism to display information to a user.

Instructions for the operating system, applications, and/or programs may be located in storage devices 516, which are in communication with processor unit 504 through communications framework 502. In these illustrative examples, the instructions are in a functional form on persistent storage 508. These instructions may be loaded into memory 506 for execution by processor unit 504. The processes of the different embodiments may be performed by processor unit 504 using computer implemented instructions, which may be located in a memory, such as memory 506.

These instructions are referred to as program code, computer usable program code, or computer readable program code that may be read and executed by a processor in processor unit 504. The program code in the different embodiments may be embodied on different physical or computer readable storage media, such as memory 506 or persistent storage 508.

Program code 518 is located in a functional form on computer readable media 520 that is selectively removable and may be loaded onto or transferred to data processing system 500 for execution by processor unit 504. Program code 518 and computer readable media 520 form computer program product 522 in these examples. In one example, computer readable media 520 may be computer readable storage media 524 or computer readable signal media 526. Computer readable storage media 524 may include, for example, an optical or magnetic disk that is inserted or placed into a drive or other device that is part of persistent storage 508 for transfer onto a storage device, such as a hard drive, that is part of persistent storage 508. Computer readable storage media 524 also may take the form of a persistent storage, such as a hard drive, a thumb drive, or a flash memory, that is connected to data processing system 500. In some instances, computer readable storage media 524 may not be removable from data processing system 500. In these examples, computer readable storage media 524 is a physical or tangible storage device used to store program code 518 rather than a medium that propagates or transmits program code 518. Computer readable storage media 524 is also referred to as a computer readable tangible storage device or a computer readable physical storage device. In other words, computer readable storage media 524 is a media that can be touched by a person.

Alternatively, program code 518 may be transferred to data processing system 500 using computer readable signal media 526. Computer readable signal media 526 may be, for example, a propagated data signal containing program code 518. For example, computer readable signal media 526 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 518 may be downloaded over a network to persistent storage 508 from another device or data processing system through computer readable signal media 526 for use within data processing system 500. For instance, program code stored in a computer readable storage medium in a server data processing system may be downloaded over a network from the server to data processing system 500. The data processing system providing program code 518 may be a server computer, a client computer, or some other device capable of storing and transmitting program code 518.

The different components illustrated for data processing system 500 are not meant to provide architectural limitations to the manner in which different embodiments may be implemented. The different illustrative embodiments may be implemented in a data processing system including components in addition to or in place of those illustrated for data processing system 500. Other components shown in FIG. 5 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 504 may take the form of a hardware unit that has circuits that are manufactured or configured for a particular use. This type of hardware may perform operations without needing program code to be loaded into a memory from a storage device to be configured to perform the operations. For example, when processor unit 504 takes the form of a hardware unit, processor unit 504 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. With this type of implementation, program code 518 may be omitted because the processes for the different embodiments are implemented in a hardware unit.

In still another illustrative example, processor unit 504 may be implemented using a combination of processors found in computers and hardware units. Processor unit 504 may have a number of hardware units and a number of processors that are configured to run program code 518. With this depicted example, some of the processes may be implemented in the number of hardware units, while other processes may be implemented in the number of processors.

In another example, a bus system may be used to implement communications framework 502 and may be comprised of one or more buses, such as a system bus or an input/output bus. Of course, the bus system may be implemented using any suitable type of architecture that provides for a transfer of data between different components or devices attached to the bus system.

Additionally, a communications unit may include a number of more devices that transmit data, receive data, or transmit and receive data. A communications unit may be, for example, a modem or a network adapter, two network adapters, or some combination thereof. Further, a memory may be, for example, memory 506, or a cache, such as found in an interface and memory controller hub that may be present in communications framework 502.

Thus, the illustrative embodiments provide a method, apparatus, and computer program product for detecting abnormal behavior of users. In one example, a program identifies from a log of user activity, a first number of actions performed on one or more resources by a user over a first time period that match a pattern of user activity for a task associated with one or more roles of users. In this example, the one or more roles of the users is generated by the program from the log of user activity based on actions of the users over a period of time selected for determining the roles of the users. In this example, the program identifies from the log of user activity, a second number of actions performed on one or more resources by the user over a second time period that match the pattern of user activity. The program calculates an amount of deviation between the first number of actions and the second number of actions, wherein the deviation identifies a difference between amounts of time spent in the one or more roles. The program next determines whether the amount of deviation between the first number of actions and the second number of actions exceeds a threshold for abnormal behavior. In this example, the threshold for abnormal behavior is one of a threshold for abnormal behavior of the user, a threshold for abnormal behavior of the user in the one or more roles, a threshold for abnormal behavior of the users, and a threshold for abnormal behavior of the users in the one or more roles. Responsive to the amount deviation exceeding the threshold, the program then generates a report of activity of the user from the log of user activity. In this example, the report includes the amount of deviation between the first number of actions and the second number of actions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components but do not preclude the presence or addition of one or more other features, integers, steps, operations, elements, components, and/or groups thereof As used herein, the phrase "at least one of", when used with a list of items, means that different combinations of one or more of the listed items may be used and only one of each item in the list may be needed. For example, "at least one of item A, item B, and item C" may include, for example, without limitation, item A, or item A and item B. This example also may include item A, item B, and item C, or item B and item C. In other examples, "at least one of" may be, for example, without limitation, two of item A, one of item B, and ten of item C; four of item B and seven of item C; and other suitable combinations.

The flowcharts and block diagrams in the figures illustrate the architecture, functionality, and operation of possible implementations of systems, methods, and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be performed substantially concurrently, or the blocks may sometimes be performed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Figure 6:
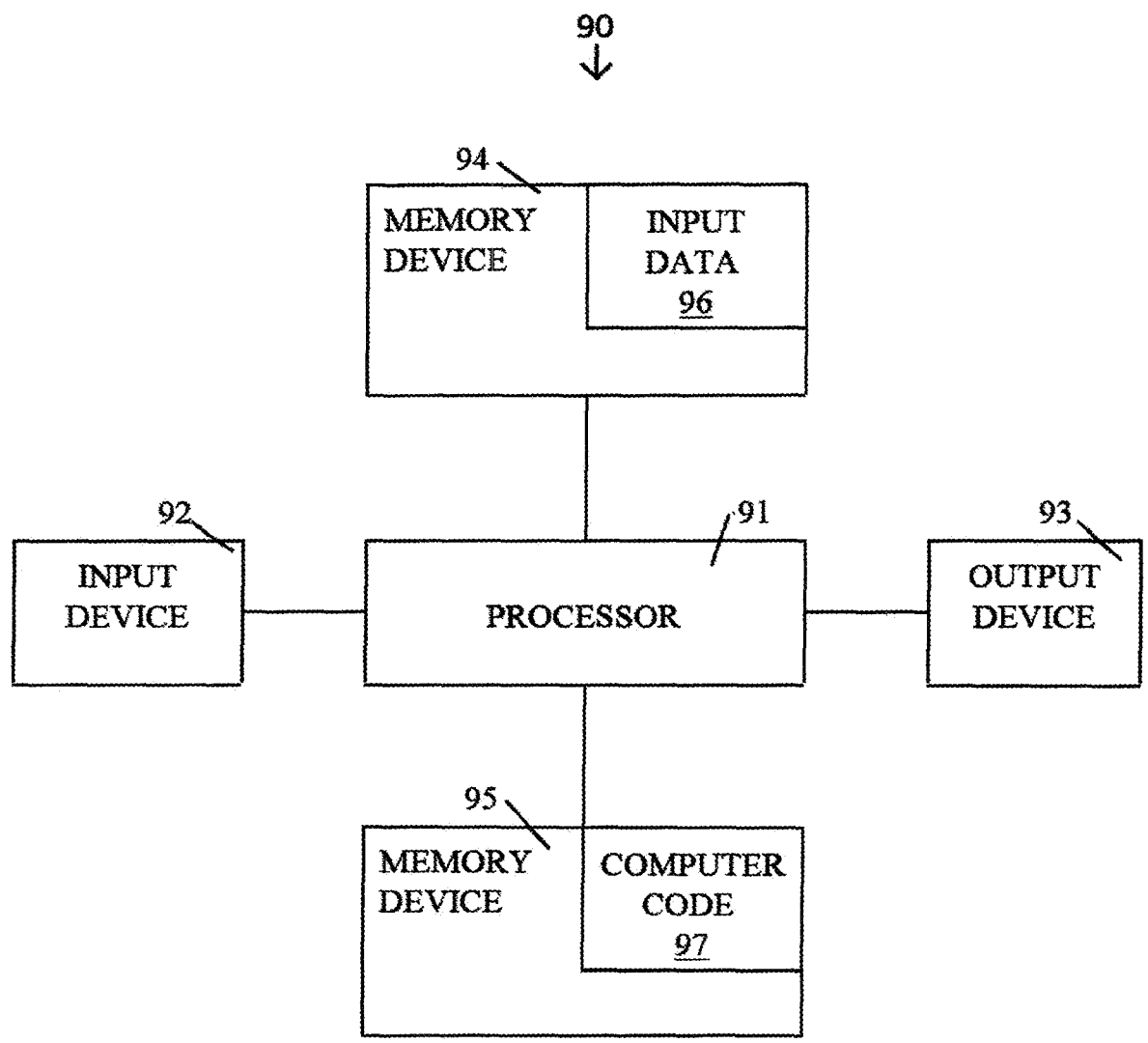
FIG. 6 illustrates a computer system used for implementing the methods of the present invention.

FIG. 6 illustrates a computer system 90 used for implementing the methods of the present invention. The computer system 90 includes a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97 which is a computer program that includes computer-executable instructions. The computer code 97 includes software or program instructions that may implement an algorithm for implementing methods of the present invention. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 6) may be used as a computer usable storage medium (or program storage device) having a computer readable program embodied therein and/or having other data stored therein, wherein the computer readable program includes the computer code 97. Generally, a computer program product (or, alternatively, an article of manufacture) of the computer system 90 may include the computer usable storage medium (or said program storage device).

The processor 91 may represent one or more processors. The memory device 94 and/or the memory device 95 may represent one or more computer readable hardware storage devices and/or one or more memories.

Thus the present invention discloses a process for supporting, deploying and/or integrating computer infrastructure, integrating, hosting, maintaining, and deploying computer-readable code into the computer system 90, wherein the code in combination with the computer system 90 is capable of implementing the methods of the present invention.

While FIG. 6 shows the computer system 90 as a particular configuration of hardware and software, any configuration of hardware and software, as would be known to a person of ordinary skill in the art, may be utilized for the purposes stated supra in conjunction with the particular computer system 90 of FIG. 6. For example, the memory devices 94 and 95 may be portions of a single memory device rather than separate memory devices.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although certain embodiments of this invention have been described above with a certain degree of particularity, those skilled in the art could make numerous alterations to the disclosed embodiments without departing from the spirit or scope of this invention.

For example, the methods described herein can be either hardware- or software-implemented.

All directional references (e.g., upper, lower, upward, downward, left, right, leftward, rightward, top, bottom, above, below, vertical, horizontal, clockwise, and counter-clockwise) are only used for identification purposes to aid the reader's understanding of the present invention, and do not create limitations, particularly as to the position, orientation, or use of the invention. Joinder references (e.g., attached, coupled, connected, and the like) are to be construed broadly and may include intermediate members between a connection of elements and relative movement between elements. As such, joinder references do not necessarily infer that two elements are directly connected and in fixed relation to each other.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others or ordinary skill in the art to understand the embodiments disclosed herein.

What is claimed is:

1. A method implemented by a computer in real time for detecting abnormal behavior of a plurality of users, the method comprising:
   identifying, by a computer, a first user based on a first user definition and at least one first-user personal device associated with said first user;
   identifying, by the computer, a second user based on a second user definition and at least one second-user personal device associated with said second user;
   monitoring activities, by the computer in real time, of said first and second users based on said first and second user definitions, first location data received over a time series from said at least one first-user personal device, and second location data received over said time series from said at least one second-user personal device;
   identifying, by the computer in real time, a proximity distance between said at least one first-user and said at least one second-user personal devices over said time series based on said first and second location data;
   generating, by the computer in real time, a first movement pattern for said at least one first-user personal device and a second movement pattern for said at least one second-user personal device over said time series based on said first and second location data and said proximity distance;
   creating, by the computer in real time, at least one workflow based on a comparison of said first and second movement patterns, said workflow associated with accomplishment of a task by at least one of said first user and second user, said workflow being indicative of relationships between past activities of said first and second users in accomplishing said task, said workflow including a checklist of features associated with said at least one workflow;
   monitoring, by the computer in real time, a current location of both of said first and second users based on said at least one first-user personal device and said at least one second-user personal devices;
   comparing, by the computer, said current location with said at least one workflow;
   detecting, by the computer in real time, a deviation from said at least one workflow in response to said comparing said current location;
   generating, by the computer in real time, an alert in response to said detecting said deviation;
   providing said alert to at least one of said first and second users based at least in part on said current location and said relationships between past activities of said first and second users in accomplishing said task; and
   updating said workflow upon accomplishment of said task.

2. The method of claim 1, further comprising:
   establishing said at least one workflow based on tracking, by the computer, of additional devices associated with said first and second users; and
   said detecting, by the computer in real time, said deviation from said at least one workflow includes comparing said additional devices with said checklist.

3. The method of claim 1, further comprising:
   detecting, by the computer in real time, said deviation by fitting the first user activity to a model to obtain a list of role fitness scores and, using a role fitness profile of the first user, a distance function is applied to measure an amount of deviation between the role fitness profile of the first user and an obtained role fitness for the later time period.

4. The method of claim 3, further comprising:
   receiving said first and second user definitions, by the computer, from a source selected from a group consisting of an RFID tag data, computer login data, identification badge data, social media data, vehicle location data, cell phone data, and residential security data.

5. The method of claim 1, further comprising:
   additionally tracking, by the computer, said first and second location data of said first and second users based on image recognition data respectively collected, by the computer, for said first and second users.

6. The method of claim 1, further comprising:
   comparing, by the computer, said current location with calendar events stored for said first and second users.

7. The method of claim 1, further comprising:
storing, by the computer, a record of data related to personal associations of said first and second users to define said first and second user definitions.

8. The method of claim 1, further comprising:
establishing said at least one workflow based on tracking, by the computer, of said first and second user definitions; and
said detecting, by the computer, said deviation from said at least one workflow includes comparing said first and second user definitions with said checklist.

9. The method of claim 1, further comprising:
identifying that any one of said at least one first-user personal device and said at least one of said at least one second-user personal device is exchanged between said first and second users.

10. The method of claim 1, further comprising:
updating, by the computer, said workflow based on data collected by the computer related to said current location and said first and second user definitions.

11. A system for detecting in real time abnormal behavior of a plurality of users, the system comprising: a processor, wherein the processor is configured to perform:
identifying a first user based on a first user definition and at least one first-user personal device associated with said first user;
identifying a second user based on a second user definition and at least one second-user personal device associated with said second user;
monitoring activities of said first and second users based on said first and second user definitions and first location data received over a time series from said at least one first-user personal device and second location data received over said time series from said at least one second-user personal device in real time;
identifying a proximity distance between said at least one first-user and said at least one second-user personal devices over said time series based on said first and second location data in real time;
generating a first movement pattern for said at least one first-user personal device and a second movement pattern for said at least one second-user personal device over said time series based on said first and second location data and said proximity distance;
creating at least one workflow based on a comparison of said first and second movement patterns, said workflow associated with accomplishment of a task by at least one of said first user and said second user, said workflow being indicative of relationships between past activities of said first and second users in accomplishing said task, said workflow including a checklist of features associated with said at least one workflow;
monitoring a current location of at least one of said first and second users based on said at least one first-user personal device and said at least one second-user personal devices in real time;
comparing said current location with said at least one workflow in real time;
detecting a deviation from said at least one workflow in response to said comparing said current location;
generating an alert in response to said detecting said deviation in real time;
providing said alert to at least one of said first and second users based at least in part on said current location and said relationships between past activities of said first and second users in accomplishing said task; and
updating said workflow upon accomplishment of said task.

12. The system of claim 11, further comprising:
establishing said at least one workflow based on tracking, by the computer, of additional devices associated with said first and second users; and
said detecting, by the computer, said deviation from said at least one workflow includes comparing said additional devices with said checklist.

13. The system of claim 11, further comprising:
identifying, by the computer, said first and second user definitions based on personal associations of said first and second users.

14. The system of claim 13, further comprising:
receiving said first and second user definitions, by the computer, from a source selected from a group consisting of an RFID tag data, computer login data, identification badge data, social media data, vehicle location data, cell phone data, and residential security data.

15. The system of claim 11, further comprising:
additionally tracking, by the computer, said first and second location data of said first and second users based on image recognition data respectively collected, by the computer, for said first and second users.

16. The system of claim 11, further comprising:
comparing, by the computer, said current location with calendar events stored for said first and second users.

17. The system of claim 11, further comprising:
establishing said at least one workflow based on tracking, by the computer, of said first and second user definitions; and
said detecting, by the computer, said deviation from said at least one workflow includes comparing said first and second user definitions with said checklist.

18. A computer program product for detecting abnormal behavior of a plurality of users, the computer program product comprising a computer readable storage medium, the computer readable storage medium not being a propagating signal, the computer readable storage medium readable by a processing circuit and storing instructions run by the processing circuit for performing a method, said method comprising:
identifying a first user based on a first user definition and at least one first-user personal device associated with said first user;
identifying a second user based on a second user definition and at least one second-user personal device associated with said second user;
monitoring activities of said first and second users based on said first and second user definitions and first location data received over a time series from said at least one first-user personal device and second location data received over said time series from said at least one second-user personal device;
identifying a proximity distance between said at least one first-user and said at least one second-user personal devices over said time series based on said first and second location data;
generating a first movement pattern for said at least one first-user personal device and a second movement pattern for said at least one second-user personal device over said time series based on said first and second location data and said proximity distance;
creating at least one workflow based on a comparison of said first and second movement patterns, said workflow associated with accomplishment of a task by at least one of said first user and said second user, said workflow being indicative of relationships between past activities of said first and second users in accomplishing said task, said workflow including a checklist of features associated with said at least one workflow;

monitoring a current location of at least one of said first and second users based on said at least one first-user personal device and said at least one second-user personal devices in real time;

comparing said current location with said at least one workflow in real time;

detecting a deviation from said at least one workflow in response to said comparing said current location;

generating an alert in response to said detecting said deviation in real time;

providing said alert based at least in part on current location and said relationships between past activities of said first and second users in accomplishing said task; and updating said workflow upon accomplishment of said task.

19. The computer program product of claim 18, further comprising:
    establishing said at least one workflow based on tracking, by the computer, of additional devices associated with said first and second users; and
    said detecting, by the computer, said deviation from said at least one workflow includes comparing said additional devices with said checklist.

20. The computer program product of claim 18, further comprising:
    establishing said at least one workflow based on tracking, by the computer, of said first and second user definitions; and
    said detecting, by the computer, said deviation from said at least one workflow includes comparing said first and second user definitions with said checklist.

* * * * *